March 25, 1969

D. J. MARLEY 3,434,762

HYDRODYNAMIC SHAFT BEARING

Filed July 11, 1963

INVENTOR
DAVID J. MARLEY

BY

Attorney.

March 25, 1969  D. J. MARLEY  3,434,762
HYDRODYNAMIC SHAFT BEARING
Filed July 11, 1963  Sheet 3 of 3

INVENTOR
DAVID J. MARLEY
BY
Attorney.

United States Patent Office 3,434,762
Patented Mar. 25, 1969

3,434,762
HYDRODYNAMIC SHAFT BEARING
David J. Marley, Buena Park, Calif., assignor to The Garrett Corporation, Los Angeles, Calif., a corporation of California
Filed July 11, 1963, Ser. No. 294,387
Int. Cl. F16c 7/04, 35/00, 17/06
U.S. Cl. 308—9
20 Claims This invention relates generally to rotary bearings and more particularly to improvements in hydrodynamic rotary bearings.

Rotary bearings may be broadly classified into three groups, as follows:

(1) Bearings which operate with dry friction between the relatively movable bearing surfaces,
(2) Bearings with rolling contact, and
(3) Fluid-film lubricated bearings.

In dry friction bearings, the relatively movable bearing surfaces rub directly against one another with no effective lubricating film therebetween. In bearings with rolling contact, the relatively movable bearing surfaces are supported for relative movement by intervening rollers, balls, or other similar mechanical antifriction means. Finally, in fluid-film lubricated bearings, the relatively movable bearing surfaces are supported for relative movement by an intervening lubricating film.

Included in the group of fluid-film lubricated bearings are externally pressurized bearings, commonly referred to as hydrostatic bearings, and self-acting or self-pressurizing bearings, commonly referred to as hydrodynamic bearings. Hydrostatic bearings receive a constant flow of lubricant under pressure from an external lubricant source which generates the required lubricating film pressure in the bearing. In hydrodynamic bearings, on the other hand, the required lubricating film pressure is generated by the relative movement of the bearing surfaces. Hydrodynamic bearings, however, may be supplied with a constant flow of lubricant from an external source to maintain a sufficient quantity of lubricant in the bearing or to cool the bearing.

A general object of the present invention is to provide improved rotary hydrodynamic bearings which are designed to support both radial and axial loads on a shaft.

Hydrodynamic thrust and radial bearings are well-known in the art and are particularly adapted to ultra-high rotary speed applications. As a matter of fact, the rotational speeds of some rotary machines are so high as to preclude the use of thrust and radial bearings other than hydrostatic or hydrodynamic bearings. If, in addition, it is impractical or impossible to provide the required external pressurized lubricant supply for a hydrostatic bearing, as is often the case, the bearing choice is further narrowed to hydrodynamic bearings alone. Hydrodynamic thrust and radial bearings, therefore, are becoming increasingly important in the bearing art. Hydrodynamic cone bearings are particularly useful since they support both radial and axial loads.

At this point, attention is directed to the fact that both hydrostatic and hydrodynamic bearings may be designed to use either a liquid or a gaseous lubricant. Air, for example, is commonly used as a lubricant in both hydrostatic and hydrodynamic gas bearings. For simplicity, the present invention is disclosed herein primarily in connection with the use of a gaseous lubricant, such as air or other suitable gas. As will be seen later, however, the improved hydrodynamic bearings of the invention may be designed for use with liquid as well as gaseous lubricants.

Various hydrodynamic cone bearing configurations are presently available. Unfortunately, however, these existing hydrodynamic bearings, while satisfactory for various applications, possess certain inherent deficiencies which detract from their usefulness and even preclude their use in many present day, ultra-high speed, rotary machines. The deficiencies referred to here involve the extremely high degree of accuracy and precision with which the existing hydrodynamic radial bearings must be machined, the inherent hydrodynamic instability of these bearings, and various other related characteristics thereof.

Actually, the existing hydrodynamic bearing configurations, including radial bearings, thrust bearings, cone bearings, and slider bearings, have been studied, tested, and analyzed in such great detail that the above-stated deficiencies are well-known to and understood by those skilled in the art. Nevertheless, since the present invention is so intimately involved with such deficiencies, it is thought desirable to consider the latter briefly at this point, as they apply to hydrodynamic cone bearings, in the interest of a more thorough understanding of the present invention.

To this end, consider a simple fixed geometry, hydrodynamic cone bearing system comprising a rotor or shaft with a conical bearing shoulder, which will be hereinafter referred to simply as a bearing cone, and a bushing having a conical bore in which the cone turns. As the shaft is accelerated from rest, the gas between the bearing cone and bushing is subjected to a shear action; that is to say, the boundary layer of gas adjacent the bushing tends to remain stationary because of the friction between the bushing surface and the gas while the boundary layer of gas adjacent the cone tends to rotate with the latter because of the friction between the gas and the cone surface. Every physical shaft, of course, is subjected to radial loading. Such loading may include, for example, the weight of the shaft, in those cases where the shaft axis is other than vertical, centrifugal force acting on the inherent shaft unbalance, asymmetrical driving forces on the shaft, gyroscopic forces, in those cases where the shaft is subjected to attitude changes, acceleration and deceleration forces, and so on.

This radial loading on the shaft causes the bearing cone to assume an eccentric position in the bushing, whereby the annular clearance between the cone and bushing is restricted at the position of closest approach of the cone to the bushing. The opposing surfaces of the cone and bushing converge as they approach this restriction in the direction of cone rotation and diverge as they recede from the opposite side of the restriction. Accordingly, a wedge-shaped convergent zone exists between the cone and bushing surfaces immediately ahead of the restriction and a divergent zone exists immediately behind the restriction. Owing to the internal friction of the gas in the bushing and the friction between the gas and cone, rotation of the latter wipes or drives the gas into the convergent zone, thereby creating a relatively high pressure area in the latter zone and a relatively low pressure area in the divergent zone. Accordingly, gas tends to leak or squeeze between the cone and bushing from the high pressure, convergent zone to the low pressure, divergent zone and thereby create a film between the cone and bushing. As the cone continues to accelerate, the gas pressure eventually becomes sufficient to lift or displace the cone from the bushing, thereby creating a hydrodynamic film between the bushing and cone which supports the latter both rotatably and axially. The gas then commences to rotate or whirl around the clearance space between the bushing and cone with an average rotational speed which is approximately one-half the rotational speed of the cone. At this time, the net transport of gas into the restriction between the cone and bushing is sufficient to maintain the hydrodynamic film pressure required to support the cone.

During the initial acceleration of the rotor or shaft of the bearing cone, the shaft tends to rotate on its geometric axis, and centrifugal force acting on the inherent eccentric mass of the shaft causes the cone to orbit or whirl in bushing at synchronous speed, that is at a rotational speed equal to the rotational speed of the shaft on its axis. This orbiting or whirling motion is commonly referred to as synchronous whirl and may involve either or both the cylindrical mode and conical mode. The amplitude of the synchronous whirl increases as the shaft speed approaches its lowest critical speed. In some hydrodynamic cone bearings, maximum shaft speed is limited by synchronous whirl.

Synchronous whirl, however, does not limit maximum shaft speed in all of the existing hydrodynamic cone bearings, particularly if the lowest critical speed is passed through rapidly. For example, since the orbiting amplitude of synchronous whirl becomes maximum at a relatively slow shaft speed, i.e., as the shaft approaches its lowest critical speed, a bearing may not incur damage even though synchronous whirl causes contact of the bearing cone with the bushing. Moreover, the hydrodynamic film remains effective and imposes a non-linear damping and cushioning action on the cone which inhibits damaging contact of the latter with the bushing. In addition, many of the existing bearings are stepped, or provided with extremely small clearances, or equipped with means to exert a radial stabilizing load on the shaft, or otherwise constructed to avoid failure due to synchronous whirl. Once the lowest critical speed is exceeded, the shaft tends to rotate on its mass axis so that synchronous whirl instability does not pose any further problem.

As the shaft speed of the existing cone bearings continues to increase, however, the bearings exhibit a much more serious form of instability as the shaft approaches a speed approximately twice the lowest critical shaft speed. This instability is known by various names but is most commonly referred to as half-frequency, or half-speed, whirl instability. Half-speed whirl instability results from the fact that as the shaft approaches a speed approximately equal to twice its lowest critical speed, it inherently tends to undergo harmonic vibration or whirl at its lowest critical frequency. This harmonic vibration is super-imposed on the synchronous shaft whirl and is stimulated or excited by the pressure of the half-speed, rotating hydrodynamic film whose average velocity then approaches the latter critical frequency. As a result, the excursions of the shaft rapidly increase in amplitude and the shaft approaches the bushing. During such half-speed whirl of the shaft, its whirl velocity approximates the average velocity of the fluid film. When this occurs, film support is lost with respect to the half-speed orbiting of the shaft. The end result of the rapid increase in amplitude of the cone excursions and the loss of hydrodynamic film support is direct contact of the rotating cone with the bushing. This then, is half-speed whirl instability. Since contact of the cone with the bushing occurs at relatively high cone speeds, the existing gas lubricated hydrodynamic cone bearings almost invariably fail due to such half-speed whirl instability.

Actually, half-speed whirl instability and the bearing failure caused thereby is common to both hydrodynamic cone and radial bearings. Hydrodynamic cone bearings, however, exhibit certain additional deficiencies. For example, orbital motion of the bearing cone in the bushing, particularly resonant half-speed orbital motion, imparts an axial component of motion to the cone shaft. The existing fixed geometry hydrodynamic cone bearings must also be machined with extreme precision and small tolerances and require a very close fit of the bearing cone in its bushing. As a result, the existing cone bearings require precise alignment of the cone shaft and bushing. Various hydrodynamic cone bearing configurations have been devised in the past to minimize half-speed whirl instability and the other bearing deficiencies, thereby to increase the maximum safe shaft speed. While some of these bearing configurations have been successful to a limited extent, they are, in general, complex, costly to make, and, at best, do not permit shaft speeds on the order of those permitted by the hydrodynamic cone bearing configurations of this invention.

While the foregoing discussion has concerned itself with gas bearings, it will become evident to those skilled in the art as the description proceeds that the invention is applicable to both gas-lubricated and liquid-lubricated bearings.

A more specific object of the invention, therefore, is to provide improved hydrodynamic cone bearings which avoid the above-noted and other deficiencies of the existing hydrodynamic cone bearings.

An object of prime importance is to provide improved hydrodynamic cone bearings wherein the rotor or shaft is partially resiliently supported by resiliently compliant bearing surfaces which act in a new and unique way to both materially reduce half-speed whirl instability of the bearings and minimize the possibility of bearing failure due to any half-speed whirl instability that does exist.

A further object of the invention is to provide improved hydrodynamic cone bearings which are characterized by their simplicity of construction, economy of manufacture, ability to accommodate bearing misalignment, dirt resistance, ease of repair, relatively low critical shaft speeds, relatively large clearances and resulting relatively large manufacturing tolerances, and various other unitque features of construction and optration, whereby the bearings are ideally suitaed to their intended purposes.

Other objects, advantages, and features of the invention will become apparent to those skilled in the art as the description proceeds.

Briefly, the objects of the invention are attained by providing hydrodynamic cone bearings which may be considered broadly as improvements on the so-called "foil bearings" of the prior art. In the persent hydrodynamic bearings, the shaft or rotor to be rotatably supported is radially and axially positioned by bearing means which provide a plurality of separate conical bearing surfaces spaced around the conical bearing shoulder, or bearing cone, of the rotor and each extending generally circumferentially about a portion only of the cone. At least one of these bearing surfaces is furnished by a resiliently compliant bearing element or foil. According to the preferred practice of the invention, the bearing surfaces are three in number and each is furnished by such a resiliently compliant bearing element or foil. During rotation of the rotor, the latter is radially and axially supported by hydrodynamic lubricating films between the bearing cone and the compliant bearing foils. Being compliant, the bearing foils accommodate orgital excursions of the rotor as the rotor speed approaches and passes through its critical speeds. In the illustrative embodiment of the invention, compliant yielding of the bearing foils is limited by a surrounding bearing housing or bushing, thereby to positively limit orgital excursions of the rotor.

On addition to accommodating and positively limiting rotor excursions, the hydrodyanimic cone bearings of the invention exhibit certain unique actions which, although not fully understood, have been found to both materially reduce ro eliminate half-speed whirl instability as well as prevent bearing failure due to any half-speed whirl instability that does exist. Radial bearings constructed in accordance with the invention, for example, have been successfully operated at speeds on the order of 300,000 to 600,000 r.p.m.

At this point, attention is directed to the fact that by the expression "bearing foil," as used herein, is meant, essentially, a thin flexible film lubricated bearing element or strip whose thickness relative to its other dimensions is such that it will be locally deflected by the hydrodynamic film forces between the shaft and foil. In this regard, for example, the bearing foils of this invention differ from a resiliently supported shoe bearing which is compliant only with respect to its support and is rigid with respect to its own geometry. The bearing foils in the present illustrative embodiments of the invention, for example, comprise thin, flexible spring strips, or blades of steel or other metal which compliantly support the shaft by virtue of their inherent spring stiffness.

A better understanding of the invention may be had from the following detailed description of particular illustrative embodiments thereof taken in connection with the attached drawings, wherein.

Figure 1:
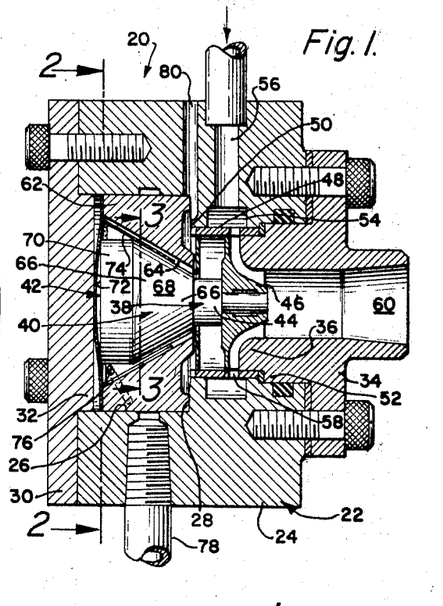
FIG. 1 is an axial section through a turboexpander equipped with a hydrodynamic cone bearing according to the invention.
Figure 2:
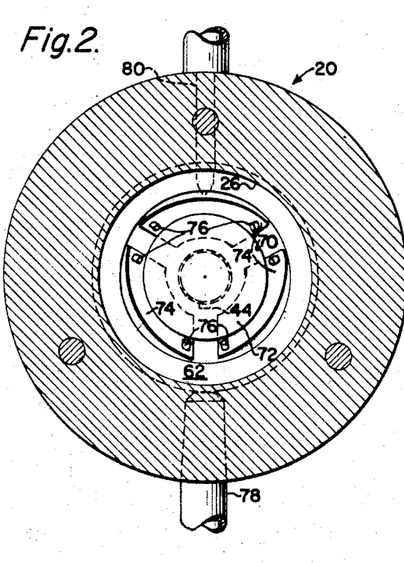
FIG. 2 is a section taken on line 2—2 in FIG. 1.

In FIGS. 1 and 2 of these drawings, numeral 20 denotes a small turboexpander of the kind used in cryogenic refrigeration systems. Turboexpander 20 comprises a housing 22 including a tubular body 24. Extending axially through body 24 is a circular opening or bore 26, the left-hand end of which is larger in diameter than its right-hand end. Between these end portions, the bore 26 is further reduced in diameter to form an internal annular shoulder 28. A plate 30 is bolted to the left-hand end of the body 24 and has a coaxial circular pad 32 which fits in the left-hand end of the body bore 26. Bolted to the right-hand end of the body 24 is a flanged exhaust fitting 34 including a coaxial cylindrical extension 36 which fits in the right-hand end of the body bore 26. The end plate 30 and exhaust fitting 34 are sealed to the body 24, as shown.

Coaxially positioned in the housing 22 is a rotor 38. Rotor 38 is rotatably supported in, and restrained against axial movement in one direction, i.e., to the right in FIG. 1, relative to the housing by a combined radial and thrust cone bearing 40 according to the invention. This bearing is hereinafter described in detail. Rotor 38 is restrained against left-hand movement in the housing by a thrust bearing 42. As discussed later, this bearing may comprise any conventional thrust bearing suitable for the purpose.

Rotor 38 comprises a short, intermediate cylindrical shaft section 44. Rigidly mounted on the right-hand end of this shaft section, within the circular opening through the interior housing shoulder 28, is a turbine runner 46 of the radial inflow type. The runner is surrounded by a sleeve 48 which fits closely in the shoulder opening and is retained against left-hand movement in the opening by a stop shoulder 50. The left-hand end of the exhaust fitting extension 36 is externally reduced in diameter slightly to fit within the sleeve 48 and to form a stop shoulder 52 which retains the sleeve against right-hand movement. The housing shoulder 28 is circumferentially grooved behind the sleeve 48 to form an annular manifold passage 54. Extending through the tubular body 24 of the expander housing is an inlet passage 56 for the fluid to be expanded. Passage 56 opens to the manifold passage, and the latter, in turn, opens to the runner 46 through a multiplicity of small ports 58 in the sleeve 48.

Accordingly, fluid entering the turboexpander through its inlet passage 56 flows to the runner 46 through the ports 58. The fluid expands through the runner and thereby drives the rotor 38 in rotation, the small rotor friction providing the required load for cooling of the fluid. The expanded fluid exhausts from the turboexpander through a passage 60 in the exhaust fitting 34. At this point attention is directed to the fact that the turboexpander shown in the drawing and described above is intended merely to illustrate one application of the combined thrust and radial cone bearing 40 of the invention. The bearing itself is capable of general application in any rotary device requiring a combined radial and thrust, hydrodynamic bearing.

Bearing 40 of this invention comprises a bushing 62 which is stationarily positioned in the housing bore 26 between the internal housing shoulder 28 and the end plate 30. Extending coaxially through this bushing is a conical bore 64, the small end of which opens toward the turbine runner 46. Rotor 38 includes an enlarged conical bearing shoulder 66 within the conical bore 64. As noted earlier, this bearing shoulder is referred to herein simply as a bearing cone. The conical surface 68 of this cone terminates some distance from the left-hand end of the bore, as the latter is viewed in FIG. 1, the cone having a left-hand cylindrical end 70 of smaller diameter than that of the large end of the conical bore. The thrust bearing 42 acts between the left-hand 72 face of the cone 66 and the inner face of the end plate pad 32. As already noted, this thrust bearing may be of any suitable type but preferably comprises a hydrodynamic thrust bearing. The bearing cone 66 is so dimensioned that a radial clearance on the order of 0.0035 inch, per inch of cone diameter at its large end, exists between the conical surface 68 of the cone and the wall of the conical bore 64 when the rotor 38 occupies its normal axial running position in the housing 22. The small diameter end of the bearing cone terminates substantially flush with the small diameter end of the conical bore. The rotor shaft 44 extends beyond the latter end of the bore to the turbine runner 46.

Positioned between the wall of the conical bore 64 and the bearing cone 66 are three generally sector-shaped bearing elements or foils 74. These bearing foils preferably comprise thin strips of spring steel or other spring metal, on the order of 0.001 in. thick. Bearing foils 74 are uniformly spaced about the cone 66 and are of such a length that each foil encompasses about 90 degrees of the cone. In the axial direction of the conical bore 64, the bearing foils extend across the circular edge of intersection of the conical and cylindrical surfaces of the bearing cone. Accordingly, the inner or shorter arcuate edge portions of the bearing foils are situated between the conical surface 68 of the cone and the wall of the bore 64 while the outer, or longer arcuate edge portions of the bearing foils are located in the large clearance space between the left-hand cylindrical end 70 of the cone and the wall of the bore.

Extending through the ends of each bearing foil, adjacent their longer arcuate edges, are apertures which receive pins 76 press fitted in the wall of the conical bore 64. The foils are thereby restrained against bodily edgewise movement. The foils, however, are free to bend or flex in a direction normal to the surface of the bearing cone and conical bore. The bearing foils 74, being made, as they are, of spring steel or other spring metal, inherently resiliently resist bending from their normal unstressed condition. In this unstressed condition, the foils are either flat or curved, in the circumferential direction of conical bore 64, to a substantially larger radius than the bore. Accordingly, when the rotor 38 is stationary, each bearing foil contacts the wall of the bore at its ends and the conical surface 68 of the bearing cone 66 between its ends. The bearing foils are thereby outwardly bowed so as to wrap partially around the cone 66, as may be best observed in FIG. 3. It is obvious, therefore, that when the rotor 38 is at rest, the bearing foils 74 are in direct contact with the bearing cone and resiliently coaxially position the latter in the bushing 62. The spring pressure of the foils against the cone also urges the rotor to the left in FIG. 1. The rotor is axially supported against left-hand movement, however, by the thrust bearing 42.

Assume now that pressure fluid is delivered to the inlet 56 of the turboexpander to drive the rotor 38 in rotation. Some of this gas leaks into the housing space containing the cone bearing 40 so that the latter, in effect, runs submerged in the gas. If the bearing space is not hermetically sealed, a constant flow of gas will occur through the bearing to cool the latter, as is usual in the hydrodynamic bearing art. The illustrated turboexpander, for example, has an inlet 78 and an outlet 80 for an auxiliary cooling gas. The present bearings, of course, will run in any gas, including air. In some cases, a seal may be placed between the turbine runner 46 and the bearing space, and a gas, different than that delivered to the turbine, may be supplied to the bearing space. For example, the bearing space might simply be open to atmosphere, whereby the gas in which the bearing runs would be air.

Figure 3:
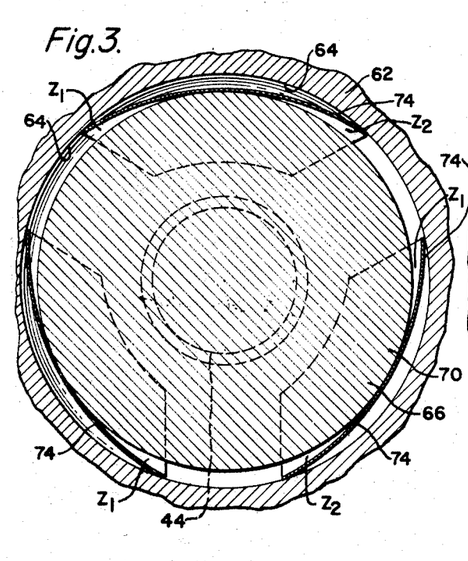
FIG. 3 is an enlarged section taken on line 3—3 of FIG. 1 illustrating the bearing foils of the cone bearing in the positions they assume when the shaft is at rest.

As the rotor 38 accelerates from rest, the gas between the bearing cone 40 and the bearing foils 74 is subjected to a shear force, the gas adjacent the foils tending to remain stationary, because of the friction between the gas and foils, and the gas adjacent the cone tending to rotate with the latter because of the friction between the gas and cone. Initially, however, there will be no hydrodynamic films between the bearing cone and the bearing foils so that when the rotor starts to turn, the bearing cone directly contacts and is rotatably supported by the bearing foils as shown in FIG. 3. Accordingly, a this time, the bearing foils furnish bearing surfaces for the cone. In contrast to fixed geometry hydrodynamic bearings, bearing cone 40 initially has surface contact, rather than line contact, with the inner bearing surface of each bearing foil. Also, there are three convergent zones $Z_1$ and three divergent zones $Z_2$, preceding and following the positions of closest approach of the cone to the foils, in contrast to the single convergent zone and single divergent zone in a fixed geometry bearing.

Figure 4:
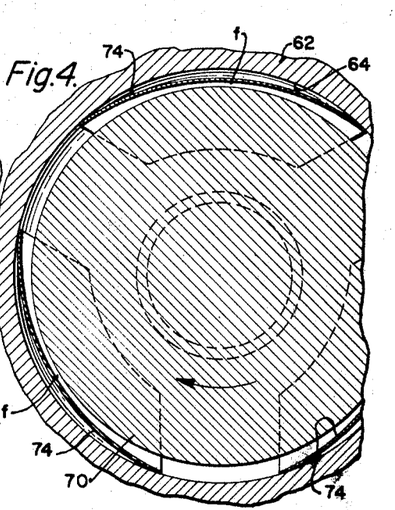
FIG. 4 is a view similar to FIG. 3 showing the bearing foils in positions they assume during rotation of the shaft.

During rotation of the rotor 38 in the direction indicated, then, the gas surrounding the bearing cone 40 is wiped or transported into each of the convergent zones $Z_1$ and from each of the divergent zones $Z_2$, thereby creating a high pressure area in each zone $Z_1$ and a low pressure area in each zone $Z_2$ so that gas tends to leak from each zone $Z_1$ to the adjacent zone $Z_2$. Conitnued acceleration of the rotor eventually increases the gas pressure in the convergent zones $Z_1$ sufficiently to deflect the bearing foils outwardly, away from the bearing cone thereby creating hydrodynamic bearing films $f$ between the cone and bearing foils, as shown in FIG. 4. These films then support the rotor for substantially frictionless rotation. The films $f$ are of substantially uniform thickness, as illustrated, and the film pressure is substantially constant along the length of each film.

Owing to the conical taper of the bearing cone 40, the hydrodynamic films $f$ axially support the rotor 38 against right-hand movement in FIG. 1. The pressure of these films against the cone, on the other hand, urges the rotor to the left in FIG. 1. The rotor is axially supported against such left-hand movement by the thrust bearing 42.

At this point, attention is directed to one advantage of the present hydrodynamic cone bearing. Since the bearing foils 74 are resiliently compliant and the hydrodynamically generated film pressures on the bearing cone are substantially in balance, such pressures tend to displace the bearing foils from the shaft rather than shaft from the bearing foils. When the hydrodynamic bearing films $f$ develop, the gas commences to rotate or whirl through the clearance space between the shaft and each foil at an average velocity approximating one-half the shaft speed. The net transport of gas into the convergent zones $Z_1$ is sufficient to maintain the hydrodynamic film pressure required to support the shaft.

During initial acceleration of the rotor 38, the latter tends to rotate on its geometric axis, and centrifugal force acting on the inherent eccentric mass of the rotor causes the latter to undergo synchronous whirl. A second advantage of the present hydrodynamic cone bearing over the conventional fixed geometry cone bearing resides in the fact that the bearing foils 74, being compliant, yield to accommodate such synchronous whirl, whereby the possibility of bearing failure due to synchronous whirl is eliminated. Moreover, as discussed later, the bearing foils 74, the hydrodynamic films $f$, and the static gas films behind the bearing foils, that is, between the foils and the wall of conical bore 64, impose a non-linear elastic cushioning and damping action on the rotor 38, thereby resisting and reducing the amplitude of its synchronous whirl. In regard to compliant yielding of the bearing foils, attention is directed to FIG. 4a wherein it is evident that as the bearing cone 40 orbits toward a bearing foil 74, or toward the converging ends of two adjacent foils, the pressure of the hydrodynamic film between the cone and the foil being approached tends to increase, thereby deflecting the foil outwardly against the spring stiffness of the foil. Thus, as the cone orbits toward each foil in succession during its orbital progression around the bearing axis, the foil being approached yields outwardly to accommodate such orbital motion and, at the same time, maintain the proper film pressure and thickness. As the bearing cone recedes from a bearing foil, on the other hand, the film pressure between the foil and the cone tends to decrease so that the elasticity of the foil pulls the latter in toward the cone to maintain the film thickness and pressure. Thus, each foil moves in and out so as to, in effect, follow the cone as the latter orbits about the bearing axis, and thereby maintain a uniform hydrodynamic film thickness and pressure around the cone.

At this point, then, it is important to note that because of the compliancy of the bearing foils, the hydrodynamic films $f$ between the bearing cone 40 and the bearing foils 74 remain intact and effective to rotatably support the cone as the latter orbits. Some film squeeze, of course, does occur between the orbiting cone and each foil as it is approached by the cone. Since the foils can yield, however, such film squeeze is small. This is in contrast to a fixed geometry cone bearing in which the outer supporting surface for the hydrodynamic film, i.e., the bushing, is rigid and non-compliant, whereby excursions of the orbiting cone, even during synchronous whirl, may squeeze the film sufficiently to produce contact of the cone with the bushing.

It is obvious, of course, that the present compliant bearing foils 74 will accommodate both the cylindrical and conical modes of synchronous whirl. As noted earlier, the amplitude of synchronous whirl becomes maximum as the rotor 38 passes through its lowest critical speed and when this speed is exceeded, the rotor commences rotation on its mass axis, whereby synchronous whirl, while it continues, is no further problem.

Here, a further advantage of the present hydrodynamic cone bearing over the fixed geometry cone bearing should be considered. As is well-known in the art, the natural or resonant frequency of a rotor supported in a hydrodynamic bearing, and its harmonic frequencies or speeds, are dependent on several factors including rotor stiffness and mass, and the spring rate of the hydrodynamic film or the spring rate of the bearing. For example, in the case of a rotor of given mass, stiffness, etc., turning in a hydrodynamic bearing, the lowest or fundamental resonant speed of the rotor is dependent primarily on, and is directly related to, the ratio of the spring rate of the bearing to the rotor mass. So it is that the lowest resonant or critical speed of a rotor turning in a fixed geometry hydrodynamic bearing, wherein the bushing is rigid and thus has an exceedingly high spring rate, is, in fact, relatively high, at least compared to the lowest critical speed of the same rotor turning in the present cone bearing.

The spring rate of the present cone bearing which determines the lowest critical speed, for example, is the spring rate of the bearing foils 74. Since the spring rate of these foils, and therefore the ratio of foil spring rate to rotor mass, are very low, the lowest critical rotor frequency is low. As a result, when the rotor 38 is accelerated from rest, as described above, the lowest critical speed is passed through early, at a relatively low shaft speed. Synchronous whirl of the rotor at this low critical speed is of relatively small amplitude. Accordingly, even though the excursions of the rotor during such whirl should carry the bearing cone 40 into contact with the bearing foils 74, or the latter into contact with bushing 62, the possibility of damage is minimized, or eliminated, because of the relatively slow speed at which the rotor is then turning.

As the rotor 38 continues to accelerate above its lowest critical speed, the speed of the rotor approaches a speed equal to twice the lowest critical speed at which failure occurs in fixed geometry cone bearings and other existing hydrodynamic bearings due to half-speed whirl instability. As noted earlier, the present cone bearing configurations minimize, or eliminate half-speed whirl instability and successfully avoid bearing failure from any half-speed whirl instability that does exist. The exact manner in which the present bearings operate to accomplish this is not known at the present. The success of the bearings, however, has been demonstrated by operation of bearings constructed in accordance with the invention for extended periods of time at shaft speeds on the order of 300,000 to 600,000 r.p.m. Discussed below are some of the actions and phenomena which are either known to occur or are thought to occur and which appear to contribute to the success of the present bearings.

From the earlier discussion of fixed geometry cone bearings, it will be recalled that half-speed whirl instability occurs as a result of excitation of the rotor into resonant vibration or whirl at the lowest critical rotor speed by the hydrodynamic film pressure and the other forces active on the bearing cone of the rotor as the latter approaches a speed about twice its lowest critical speed. Bearing failure occurs due to half-speed orbiting of the bearing cone relative to the outer boundary of the hydrodynamic film at a velocity approximating the average velocity of the film, which causes loss of hydrodynamic film support with respect to the half-speed orbital motion of the shaft and contact of the rapidly rotating cone with the bushing. In other words, for half-speed whirl instability and bearing failure to occur, it is necessary (1) that the hydrodynamic film pressure and other forces active on the bearing cone of the rotor excite the latter into a resonant whip, or whirl or vibration at the lowest critical speed of the rotor when the latter is rotating at about twice that speed, and (2) that the shaft orbit relative to the outer boundary of the hydrodynamic film at the average velocity of the film.

With regard to (1) above, it is evident from what has been said thus far about the action of the bearing foils and from FIG. 4 that even though the bearing cone 40 orbits in the bushing 62, as a result of rotation of the rotor 38 about its mass axis when the rotor speed exceeds the lowest critical speed, the hydrodynamic film thickness remains substantially uniform around the cone; that is, as the cone orbits, the foils move in and out, as explained above, to maintain the three films $f$ substantially uniform in thickness and pressure. As a consequence, the cone is, in effect, constantly centered with respect to the bearing foils 74. This results in an appreciable reduction in the tendency of the rotating film $f$ to excite resonant vibration or whirl of the rotor 38 when the latter approaches twice resonant speed. Moreover, as explained later, the bearing foils, the hydrodynamic films $f$, and the static gas films behind the foils, exert a non-linear, elastic damping and cushioning action on the cone. Accordingly, the tendency of the rotor 38 to break into a resonant whip as the rotor speed approaches twice the lowest critical speed is reduced.

With regard to (2) above, it is evident that since the bearing foils 74 move in and out with the bearing cone 40 as the latter orbits, the primary cause of failure of fixed geometry cone bearings, to wit, half-speed orbiting of the cone relative to the outer boundary of the hydrodynamic film, is eliminated. Thus, because the bearing foils move in and out with the orbiting cone, the distance between the cone and foils, and the hydrodynamic film thicknesses, remain generally constant, whereby even though the cone undergoes a half-speed whirl, the resultant half-speed orbiting of the cone is not relative to the outer boundary (i.e., the bearing foils) of the hydrodynamic films, so that no loss of film support occurs relative to such half-speed orbital motion. Moreover, there is no continuous annular clearance space about the cone as there is in a fixed geometry cone bearing. In the event that a reduction in the pressure of any of the hydrodynamic films $f$ should occur, the adjacent bearing foil 74 is immediately pulled inwardly toward the shaft 40, by its inherent elasticity, thereby decreasing the clearance between the bearing cone and foil. This, of course, immediately restricts gas flow between the cone and foil and thus restores the film pressure, so that no loss of hydrodynamic film support can occur as in fixed geometry cone bearings.

It has been found by actual experiment that the above actions of the bearing foils 74, as well as other actions which are not yet fully understood, and possibly yet other actions which have not yet been observed, effectively reduced or entirely eliminate, half-speed whirl instability in the present cone bearing and prevent bearing failure due to any half-speed whirl instability which does exist. Another factor which aids in preventing bearing failure, of course, is that even though the excursions of the bearing cone 40 drive the latter into contact with one of the bearing foils 74, the tendency for bearing damage to occur is much less than in a fixed geometry bearing because of the compliancy of the foils in contrast to the rigidity of the bushing of a fixed geometry cone bearing.

As the rotor 38 is accelerated above twice its lowest critical speed, of course, other critical speeds are encountered, such as the speed at which the bearing foils 74 commence resonant vibration. Since the ratio of the foil spring rate to foil mass is very high, however, the critical speed is very high. In fact this latter critical speed is so high that it poses no problem in many applications. The present bearings, nevertheless, have been oversped through and beyond the critical frequency of the bearing foils without damage.

It is important to note, that the wall of the conical bore 64 in the bushing 62 is effective to positively limit orbital excursions of the bearing cone 40 both during synchronous whirl and during any half-speed cone whirl that does develop.

It has been found that even though a bearing foil 74 should be thrust into apparent contact with the bore wall by the orbiting cone, bearing damage does not occur. This is believed to be due to the non-linear, elastic squeeze film cushioning action of the static gas films behind the bearing foils, as explained below.

Figure 4A:
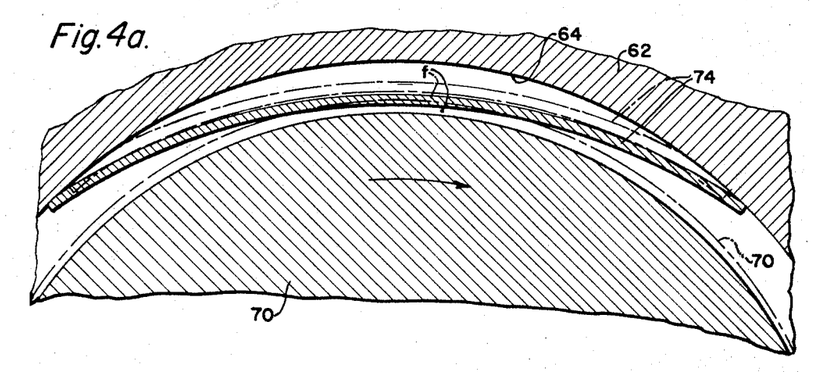
FIG. 4a is an enlarged detail view illustrating the foils during orbiting of the shaft.

In the preceding discussions, reference was made to the non-linear elastic cushioning and clamping action of the bearing foils 74. To understand this action, recall first that the bearing foils flex in and out as the bearing cone 40 approaches and then recedes from the foils during its orbital progression around the axis of bushing 62. As noted earlier, this is due to the response of the compliant foils to the changes in hydrodynamic film pressure which tend to occur as the cone orbits. This flexing of the bearing foils is depicted in FIG. 4a wherein the solid lines illustrate the bearing cone 40 in one orbital position and the dotted lines illustrate the cone in a successive orbital position. It will be observed that as the cone orbits from its solid line position to its dotted line position, the bearing foil 74 being approached flexes outwardly, as just mentioned, whereby the orbital motion is damped by the spring stiffness of the bearing foil.

Moreover, it is to be noted that as the bearing foil 74 flexes outwardly, the surface area of each circumferential end of the foil in contact with the wall of the bushing bore 64 progressively increases. This causes a progressive decrease in the circumferential length of the unsupported center portion of the foil and a resultant increase in its spring stiffness. Similarly, the circumferential length of the unsupported center portion of the bearing foil progressively increases, and the spring stiffness of the foil progressively decreases, upon inward flexing of the foil as the cone recedes from the foil. This change in the spring stiffness of the bearing foil introduces a non-linearity into the damping action exerted on the bearing cone 40 by the bearing foil.

It will be further observed that the unsupported, circumferential length of the bearing foil progressively decreases, and hence the spring stiffness of the foil progressively increases, toward the small diameter end of the conical bore 64 in bushing 62. This variation in spring stiffness of the bearing foil introduces an additional non-linearity into its elastic damping action.

Attention is directed to the fact that as the bearing foil flexes in and out, as explained above, the ends of the foil rub back and forth against the wall of the conical bore 64. This rubbing of the foil ends against the bore wall is frictionally resisted and introduces yet a further non-linearity into the elastic damping action of the foil.

The foregoing discussion applies, of course, to each bearing foil 74. It is evident, therefore, that the bearing foils, while accommodating orbital excursions of the rotor 38 because of their compliancy, exert a non-linear, elastic damping and cushioning action on the bearing cone 40 which resists such orbital motion.

Earlier reference was also made to the pneumatic cushioning and damping action of the static gas films between the bearing foils 74 and the wall of conical bore 64. It is evident, of course, that static gas films do exist behind the bearing foils which inherently tend to exert a non-linear damping action on the bearing foils 74, and thereby on the rotor 38, as the foils move in and out to accommodate orbital excursions of the bearing cone 40. Moreover, these films produce a squeeze film effect when the foils are thrust toward the bushing 62 by the orbiting cone. As already noted, this squeeze film effect is believed to prevent damaging impact of the bearing foils with the bushing. In addition, it appears that the rapid vibrations of the bearing foils 74 which occur as the result of orbital motion of the bearing cone 40 produce a pneumatic pumping action which increases the pressure, and thereby the stiffness, of the static films. This increased stiffness of the static films, of course, improves their pneumatic damping and cushioning properties.

The preceding discussion has dealt primarily with phenomena which are common to both radial and cone bearings. As noted earlier, however, cone bearings exhibit certain other phenomena which are unique to cone bearings. Thus, as explained in the earlier description, orbital motion of the bearing cone in a conventional fixed geometry cone bearing, particularly the resonant, half-speed whirl of the cone which occurs due to half-speed whirl instability, produces axial components of thrust on the cone, because of the conical taper. These axial thrusts on the cone, in turn, cause axial oscillation of the rotor.

It is immediately evident that the afore-described non-linear cushioning and damping action of the bearing foils 74 and the static gas films behind the foils of the present cone are effective to cushion and dampen such axial oscillations of the rotor 38, as well as orbital motion of the rotor. As a result, it has been found that the present hydrodynamic cone bearing configuration appreciably reduces or entirely eliminates the axial rotor motions which occur in a conventional fixed geometry cone bearing. The thrust bearing 42, of course, axially supports and restrains the rotor in the left-hand direction.

Figures 5, 6, 7, 8:
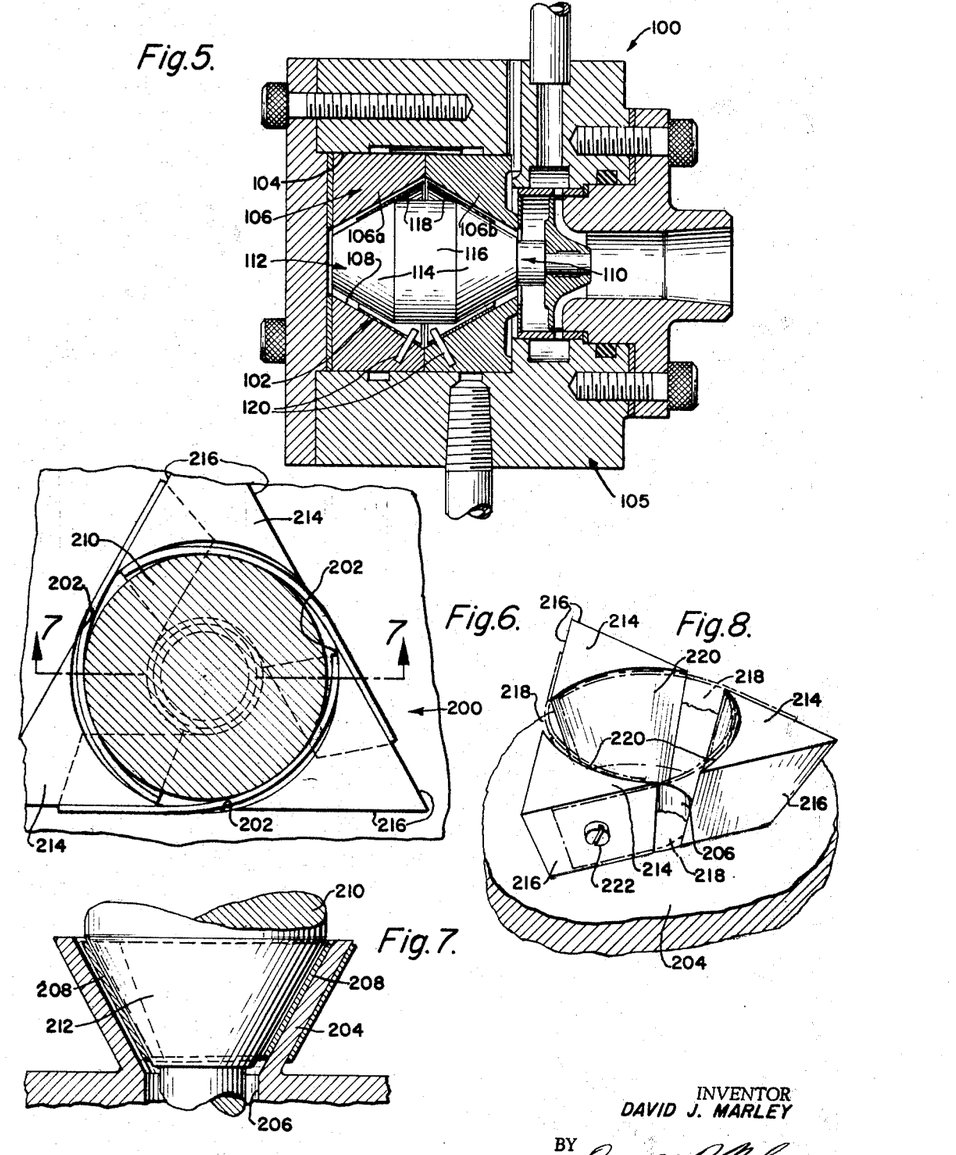
FIG. 5 is an axial section through a turboexpander equipped with a double cone bearing according to the invention.
FIG. 6 illustrates a further modified cone bearing according to the invention.
FIG. 7 is a section taken on line 7—7 in FIG. 6.
FIG. 8 is a perspective view of the cone bearing in FIG. 6 with the bearing foils shown in phantom lines for the sake of clarity.

Reference is now made to FIG. 5 which illustrates a turboexpander 100 equipped with a double cone bearing 102 according to the invention. Turboexpander 100 is essentially identical to the turboexpander described earlier and, therefore, will not be explained in detail. Suffice it to say that the turboexpander 100 differs from the earlier turboexpander only in the greater axial length of the left-hand end portion of the central opening or bore 104 in the housing 105 of the turbine 100. This increased length is necessary to accommodate the greater over-all length of the double cone bearing 102, now to be described, than the earlier single cone bearing 40 of the invention.

Double cone bearing 102 comprises a bushing 106 fixedly positioned in the left-hand end of the housing bore 104 and having a bore 108 which is conically tapered from each end of the bushing toward the center of the bushing, as shown. For convenience of manufacture, the bushing 106 may be made in two halves 106a and 106b, each having a conical bore, which are positioned with end faces thereof in contact and with the large ends of the conical bores in the two bushing halves facing one another. The shaft or rotor 110 of the turboexpander 100 includes a bearing shoulder 112 positioned in the conical bore 108 of bushing 106. This shoulder, which is hereinafter referred to as a bearing cone, or simply a cone, is conically tapered from each end toward the center in such manner that the shoulder has two conical ends 114 separated by a cylindrical center section 116. Center section 116 has a diameter which is substantially less than the major, center diameter of the conical bore 108, whereby a relatively large annular clearance space exists between the center section and the wall of the conical bore radially opposite the latter section. The conical ends 114 of the cone 112 are dimensioned so that when the cone is axially and radially centered in the bushing 106, a radial clearance on the order of 0.0035 in. exists between the conical surfaces of the cone and the opposing conical walls of the bushing bore 108.

Positioned between each conical end 114 of the bearing cone 112 and the bushing 106 are three thin, flexible, resiliently compliant generally sector-shaped bearing foils 118 identical to the bearing foils described earlier. These foils comprise spring steel, or other suitable spring material, and are on the order of 0.001 in. thick. Bearing foils 118 are uniformly spaced about the bearing cone and each encompasses about 90° of the cone. The shorter arcuate edge portions of these foils are disposed between the conical cone ends 114 while the longer arcuate edges of the foils are located in the clearance space between the center portion of the conical bore and the cylindrical center section of the bearing cone. These latter edge portions of the bearing foils are apertured adjacent the ends of the foils to receive pins 120 press fitted in the bushing 106. The bearing foils are thereby restrained against edgewise movement, as before.

Each bearing foil 118, in its normal unstressed condition, is flat or curved to a substantially larger radius than the wall of the conical bore 108 in bushing 106. Accordingly, the ends of each bearing foil engage the wall of the bore and the center portion of each foil engages the bearing cone 112 to resiliently, coaxially position the latter in the bushing, as in the earlier cone bearing of the invention.

It is evident from the preceding description that the bearing foils 118 in the double cone bearing of FIG. 5 function in essentially the same way to radially and axially support the rotor 110 as the bearing foils 74 in single cone bearing 40 of FIG. 1. Accordingly, it is unnecessary to discuss the operation of the double cone bearing in detail. It is obvious, of course, that in the double cone bearing of FIG. 5, the rotor 110 is axially supported and restrained in both directions by the bearing itself so that no auxiliary thrust bearing is required as in the single cone bearing configuration of FIG. 1.

The modified cone bearing 200 of FIGS. 6 through 9 embodies an alternative method of mounting the bearing foils 202. Bearing 200, which is shown to be a single cone bearing, comprises a bushing 204 having a bore 206 extending therethrough. Bore 206 terminates in a conical end 208. The shaft or rotor 210 to be rotatably supported, has a conical bearing shoulder, or bearing cone 212 fitting in the conical bore 208. The end of bushing 204 is machined to form three triangular bosses 214 which are uniformly spaced about the bore. The side faces 216 of these bosses are disposed in common planes which intersect and parallel the wall of the conical bore 208. The bosses are thereby spaced by slots 218 which open radially to the bore 208. The bosses 214 have conic inner surfaces 220 which form the wall of bore 208.

Positioned between the bearing cone 212 and the bushing surfaces 220 are the bearing foils 202 which comprise thin, flexible, resiliently compliant strips of spring steel or other suitable spring metal as in the earlier bearings. One end of each bearing foil 202 seats against one face 216 of a boss 214 and is attached to the latter by bolts 222 or in some other convenient way. The opposite end of each bearing foil extends between the bearing cone 212 and the conic inner surface 220 of an adjacent boss 214. The three bearing foils are secured to corresponding faces 216 of the bosses 214 and extend around the cone in a direction opposing the direction of rotation of shaft 210. At this point, it should be noted that the illustrated extension of the foils around the cone in a direction opposing the direction of shaft rotation is preferred, but not essential. Thus, it has been found that with this direction of foil extension, the torque required to rotate the shaft from rest is less than that required when the foils extend in the direction of shaft rotation. Nevertheless, the foils may, if desired, extend in the direction of shaft rotation, or the shaft may rotate in the direction of shaft rotation, or the shaft may rotate in both directions, i.e., its direction of rotation may be reversed so that at times, the foils will extend in the direction of shaft rotation and at other times in the opposite direction to shaft rotation.

As in the earlier bearings, the bearing foils 202, in their original, unstressed condition, may be flat or slightly bowed. Moreover, the bearing foils are generally sector-shaped when laid out flat, so that when the foils are positioned in the bushing 204, they assume a generally conical shape of the bore 208 in the bushing. These strips are on the order of 0.001 in. thick and the radial clearance between the bearing cone 212 and the conic bushing surfaces 220, when the cone is centered in its normal running position in the bushing, is on the order of 0.0035 in., as before. As a result, when the shaft 210 is at rest, each foil contacts the adjacent boss surface 220 at at least one position, i.e., at the free end of the foil, and contacts the bearing cone 212 between its ends, as shown best in FIG. 9. It is evident, therefore, that the bearing foils tend to support the bearing cone in a generally centered position in the bushing 204. Owing to the aforementioned dimensions of the radial clearance between the cone and bushing and the foil thickness, each foil is normally spaced slightly from its opposing boss face 220 opposite the position where the foil contacts the cone. The clearances have been exaggerated in the drawings, for clarity.

Figure 9:
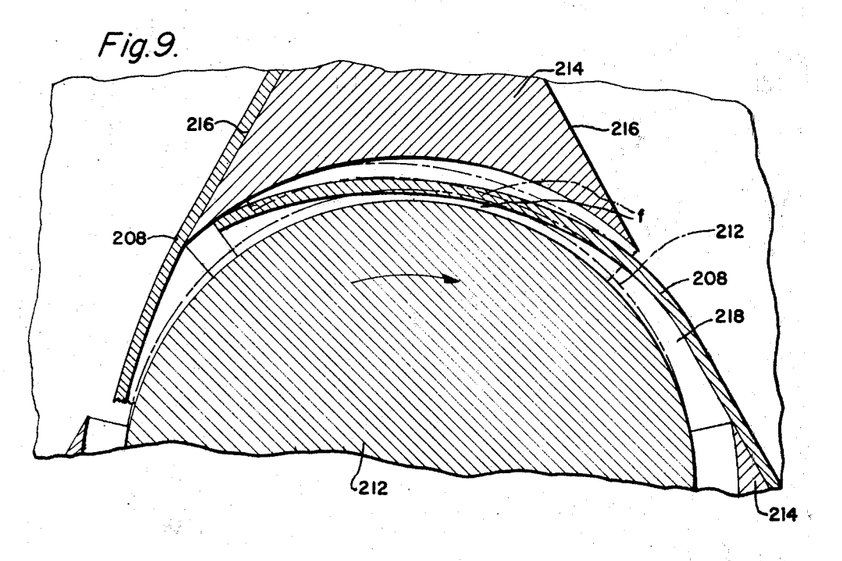
FIG. 9 is an enlarged detail view illustrating the bearing foils in the cone bearing of FIG. 6 during orbital motion of the shaft.

When the shaft 210 is driven in rotation, hydrodynamic films $f$ are generated between the shaft and the bearing foils 202 in much the same way as described earlier in connection with the cone bearings of FIGS. 1–5. Thus, when the shaft is accelerated from rest, bearing cone 212 initially engages, and is directly rotatably supported by the foils, as shown in FIG. 6. Rotation of the bearing cone in the bushing 204 wipes or transports gas into the convergent zones Z between the cone and bearing foils in much the same as described before. As the speed of shaft 210 increases, therefore, the gas pressure in these zones increases and eventually becomes sufficient to separate the foils from the cone, thereby creating hydrodynamic films $f$ between the cone and foils, as shown in FIG. 9. The shaft 210 is then rotatably supported, and axially supported in one direction, by the films. Attention is directed to the fact that while only one bearing foil 202 is shown in its entirety in FIG. 9, for the sake of clarity, the illustrated foil is typical of all of the foils. As in the earlier forms of the invention, the hydrodynamic films $f$ tend to be of generally uniform thickness and pressure because of the compliancy of the foils. It is evident, of course, that when the bearing foils separate from the bearing cone 212 to create the hydrodynamic films $f$, the foils deflect or spring outwardly against their own inherent elasticity or resiliency.

Shaft 210 initially undergoes synchronous whirl owing to its inherent unbalance, whereby the bearing cone 212 orbits in the bushing 204, as depicted in FIG. 9. The solid lines in this figure illustrate the bearing cone 212 in one orbital position and the dotted lines illustrate the cone in a successive orbital position. In the bearing under discussion, as in the earlier bearings, orbital movement of the cone toward the bearing foils tends to increase the hydrodynamic film pressure between the cone and the foil being approached. This increased film pressure deflects the approached bearing foil outwardly, as illustrated in dotted lines in FIG. 9, whereby the proper film thickness is maintained. As the orbiting cone recedes from a bearing foil, on the other hand, the film pressure between the cone and foil tends to decrease with the result that the spring tension in the foil causes the latter to spring inwardly toward the cone, thereby again maintaining the proper film thickness and pressure. Thus the bearing foils 202 in the form of the invention under discussion accommodate synchronous whirl of the shaft 210, as do the bearing foils in the earlier forms of the invention. The bushing 204 positively limits the shaft excursions as before.

The hydrodynamic bearing configuration of FIGS. 6 through 9 possesses the same advantage over the prior art fixed geometry cone bearings as the earlier described bearings of the invention that the lowest critical speed of the shaft 210 is relatively low; that is to say, in the bearing of FIGS. 6 through 9, as in the earlier described bearings, the ratio of the spring rate of the bearing foils 202 to the mass of the shaft 210, and, therefore, the lowest resonant or critical shaft speed, are low. Accordingly, this lowest critical speed is encountered early in the acceleration of the shaft from rest, so that even though synchronous whirl of the shaft should thrust a bearing foil 202 into direct contact with the bushing 204, the bearing does not incur damage.

As the shaft 210 is accelerated above its lowest critical speed, the shaft speed approaches the more serious critical, i.e., twice the lowest critical speed, at which the existing radial hydrodynamic cone bearings exhibit half-speed whirl instability and hammering and fail due to such instability. The bearing configuration of FIGS. 6 through 9 reduces or eliminates half-speed whirl instability, and avoids bearing failure due to any half-speed whirl instability that does exist, for essentially the same reasons as discussed earlier in connection with the bearing of FIGS. 1 through 5. Thus, because the bearing foils 202 are resiliently compliant and move in and out as the bearing cone 212 orbits, thereby maintaining a generally uniform hydrodynamic film thickness around the cone, the latter tends to be constantly centered with respect to foils. The tendency for the half-speed rotating hydrodynamic films to excite the shaft 210 into a half-speed whirl or resonant orbital motion is thereby reduced. Also, as discussed more fully below, the bearing foils 202 and the static gas films therebehind impose non-linear mechanical and pneumatic spring damping on the cone which inhibits half-speed resonant whirl of the shaft. Secondly, since the bearing foils move in and out with the cone to maintain a generally uniform hydrodynamic film thickness around the cone, as the latter orbits around the mass axis of shaft 210 near twice critical speed, as illustrated in FIG. 9, the cone does not orbit at half-speed relative to the foils, whereby loss of hydrodynamic film support does not occur. In the bearing of FIGS. 6 through 9, as in the earlier bearings of the invention, should any drop in hydrodynamic film pressure occur, such as would cause failure of the existing hydrodynamic cone bearings, the spring tension in the compliant bearing foils 202 causes the latter to immediately spring in toward the cone 212, thereby restricting the clearance between the cone and foils and restoring the film pressure to its proper value, in much the same manner as discussed earlier in connection with FIGS. 1 through 5.

Moreover, it will be observed in FIG. 9 that as the bearing cone 212 orbits from the solid line position to its dotted line position, the resultant outward bowing or flexing of the approached bearing foil 202 increases the effective length of the free end of the foil in contact with the adjacent bushing surface 220 and thereby decreases the effective, unsupported length of the foil. This decrease in effective foil length, of course, occurs to each bearing foil in succession as the cone orbits in the bushing. It is obvious that as the effective length of each foil is decreased in this way, its stiffness, i.e., spring rate, increases non-linearly. In other words, the spring rate of the bearing foils 202 increases non-linearly as the orbital motion of the shaft 210 increases in amplitude. Moreover, as the foils bend in and out, their free ends frictionally rub against the inner bushing surfaces, thereby introducing an additional non-linearity into the spring action of the foils. The bearing foils 202 thereby produce non-linear elastic damping and cushioning of the shaft which inhibit synchronous and half-speed resonant whirl as well as axial oscillation of the shaft.

The non-linear elastic damping and cushioning action of the bearing foils discussed above is aided by the non-linear damping characteristics of the hydrodynamic films $f$ and by the squeeze film effect and the non-linear pneumatic damping and cushioning action of the static gas films between the bearing foils and the inner bushing surfaces 220. Thus, in the bearing 200 under consideration, as in the bearing of FIGS. 1 through 5, it appears that the rapid vibration of the bearing foils 202 which occurs as a result of orbital motion of shaft 210 creates a pneumatic pumping action that increases the static film pressure, and thereby the static film stiffness, behind the foils. This increased static film stiffness apparently introduces additional nonlinear damping and cushioning of the shaft which further inhibits half-speed whirl instability and axial shaft oscillation in the bearing.

The foregoing are some of the actions which are known or thought to occur in the hydrodynamic radial bearings of the invention whereby the bearings reduce or eliminate shaft oscillation and half-speed whirl instability and avoid bearing failure due to any half-speed whirl instability that does exist. For example, bearings constructed in accordance with invention, have been run at speeds of the order of 300,000 to 600,000 r.p.m. for extended periods of time.

At this point, several advantages of the present hydrodynamic bearing configurations, in addition to those already discussed, will be evident to those skilled in the art. Owing to the relatively large clearances and corresponding relatively small manufacturing tolerances involved in the present bearings, and their over-all simplicity, the latter are relatively simple and inexpensive to make. Moreover, the large clearances render the bearings relatively dirt resistant and enable the bearings to accommodate relatively large misalignment of the shaft and bearing. Repair of the present bearings is obviously extremely simple since it involves merely replacing the bearing foils which can be quickly and easily accomplished.

It is evident from the preceding description that the effective stiffness of the present bearings is dependent on the stiffness of the bearing foils. These foils, then, may be made as stiff as necessary to afford the bearings with the bearing stiffness required for the shaft loads involved. It should be understood, therefore, that the foil thicknesses and other bearing dimensions given above are intended to be purely illustrative.

Attention is directed to the fact that while the illustrated bearings are equipped with three bearing foils, they may embody more foils, or only two foils, or even one foil. In the last case the shaft would be rotatably supported in part by the rigid bearing bushing. This effectively increases the bearing stiffness but renders the bearing more prone to half-speed whirl instability.

The bearings may run on other lubricants than gas. Bearings according to the invention, for example, have been successfully operated using alcohol as a lubricant.

It is evident, therefore, that the invention herein described and illustrated is fully capable of attaining the objects and advantages preliminarily set forth.

Various modifications in the design arrangement of parts, and instrumentalities of the invention are possible, of course, within its spirit and scope.

We claim:

1. A film lubricated cone bearing comprising:

a bearing unit having a conical, bearing cone receiving opening and including bearing means providing separate inwardly presented conically tapered bearing surfaces spaced around said opening and each of said surfaces extending generally circumferentially about a portion only of said opening;

a bearing cone rotatably supported within said opening by said bearing means;

said bearing surfaces being adapted to be supplied with a lubricating fluid and to support the bearing cone in said opening for relative rotation to a speed at least sufficient to generate a hydrodynamic lubricating film between the cone and each bearing surface; and said bearing means including at least one relatively thin, flexible, compliant conically tapered bearing element which furnishes one of said bearing surfaces, whereby said bearing means is adapted to be radially movable relative to the bearing cone by hydrodynamic film pressure and to accommodate and dampen orbital motion of the cone.

2. A bearing according to claim 1 wherein:

said bearing element comprises a resiliently flexible bearing foil.

3. A bearing according to claim 1 wherein:

said bearing element comprises a resiliently flexible spring strip.

4. A film lubricated cone bearing comprising:
a supporting structure having a conical, bearing cone receiving opening;
bearing means within said opening providing separate inwardly presented conically tapered bearing surfaces spaced around said opening and each extending generally circumferentially about a portion only of said opening;
a shaft having at least one conical end portion being rotatably supported by said bearing means;
said bearing surfaces being adapted to be supplied with a lubricating fluid and to support the conical end portion in said opening for relative rotation to a speed at least sufficient to generate a hydrodynamic lubricating film between the end portion and each bearing surface; and
said bearing means including at least one relatively thin, flexible, compliant conically tapered bearing foil which furnishes one of said bearing surfaces and is supported by said structure at positions spaced along said one foil, whereby said bearing means is adapted to be radially positioned relative to the conical end portion by hydrodynamic film pressure and to accommodate and dampen orbital motion of the end portion.

5. A film lubricated cone bearing comprising:
a supporting structure having a conical, bearing cone receiving opening;
bearing means within said opening including a plurality of relatively thin, flexible, resiliently compliant conically tapered bearing foils spaced around said opening and each extending generally circumferentially about a portion only of the opening;
a bearing cone rotatably supported within said opening by said bearing foils;
said bearing foils having their opposite ends in sliding engagement with the wall of said opening and being spaced from said structure intermediate said opposite ends for resiliently coaxially positioning the bearing cone in said opening; and
said bearing foils having inwardly presented conically tapered bearing surfaces adapted to be supplied with a lubricating fluid and to support the bearing cone for relative rotation to a speed at least sufficient to generate a hydrodynamic lubricating film between the cone and each bearing surface, whereby said bearing foils are radially positioned relative to the cone by hydrodynamic film pressure and resiliently accommodate and dampen orbital motion of the cone.

6. A bearing according to claim 5 wherein:
said bearing foils comprise separate, resiliently flexible spring strips.

7. A film lubricated double cone bearing comprising:
a bearing unit having a shaft receiving opening which is conically tapered outwardly from each end toward the center and including at each conical end of said opening bearing means providing separate inwardly presented conically tapered bearing surfaces spaced around said opening and each extending generally circumferentially about a portion only of said opening;
a shaft having two conically tapered portions being rotatably supported by said bearing means;
said bearing surfaces being adapted to be supplied with a lubricating fluid and to support the shaft in said opening for relative rotation to a speed at least sufficient to generate a hydrodynamic lubricating film between the conically tapered portions of the shaft and each bearing surface; and
each of said bearing means including at least one relatively thin, flexible, compliant conically tapered bearing foil which furnishes one of said bearing surfaces, whereby said bearing means are adapted to be radially positioned relative to the shaft by hydrodynamic film pressure and to accommodate and dampen orbital motion of the shaft.

8. A film lubricated double cone bearing comprising:
a supporting structure having a bearing cone receiving opening which is conically tapered outwardly from each end toward the center;
a plurality of separate relatively thin, flexible, resiliently compliant, conically tapered bearing foils uniformly spaced around each end of said opening and each foil extending generally circumferentially about a portion only of the opening;
a bearing cone rotatably supported within said opening by said foils;
said bearing foils being supported by said structure at positions spaced along each foil and being spaced from the structure intermediate said positions for resiliently coaxially positioning the bearing cone in said opening; and
said bearing foils having inwardly presented conically tapered bearing surfaces adapted to be supplied with a lubricating fluid and to support the bearing cone for relative rotation to a speed at least sufficient to generate a hydrodynamic lubricating film between the cone and each bearing foil, whereby said bearing foils are radially positioned relative to the cone by hydrodynamic film pressure and resiliently accommodate and dampen orbital motions of the cone.

9. A film lubricated cone bearing rotatably supporting a shaft having a conically tapered portion comprising:
a bushing having a conical, shaft receiving bore;
bearing means within said bore including a plurality of relatively thin, flexible, resiliently compliant, conically tapered spring strips spaced around said bore extending generally circumferentially about a portion only of said bore;
said spring strips having their opposite ends in sliding engagement with the wall of the shaft receiving bore and being spaced from said bushing intermediate said opposite ends for resiliently coaxially supporting the conically tapered portion of said shaft in the bore;
said conically tapered portion of the shaft being rotatably supported within said bore by said spring strips;
said spring strips having inwardly presented conically tapered bearing surfaces adapted to be supplied with a lubricating fluid and to support the shaft for relative rotation to a speed at least sufficient to generate a hydrodynamic lubricating film between the shaft and each bearing surface, whereby said spring strips are radially positioned relative to the shaft by hydrodynamic film pressure and resiliently accommodate and dampen orbital motion of the shaft; and
the wall of said bore being effective to positively limit orbital excursions of the shaft.

10. A film lubricated cone bearing rotatably supporting a bearing cone comprising:
a bushing having a conical, bearing cone receiving bore;
a plurality of thin, flexible, resiliently compliant, conically tapered bearing foils within and extending generally circumferentially about said bore in normally spaced relation to the wall of said bore throughout at least a portion of the length of each bearing foil within the bore;
said bearing foils being uniformly spaced around said bore and each foil extending generally circumferentially about a portion only of said bore;
said bearing foils resiliently coaxially positioning the bearing cone for relative rotation in said bore;
said bearing foils having inwardly presented conically tapered bearing surfaces adapted to be supplied with a lubricating fluid and to support the bearing cone for relative rotation to a speed at least sufficient to generate a hydrodynamic lubricating film between the cone and each bearing surface, whereby said bearing foils are radially positioned relative to the cone by hydrodynamic film pressure and resiliently accommodate and dampen orbital motion of the cone; and the wall of said bore being effective to positively limit orbital excusions of the cone.

11. A bearing according to claim 10 wherein:
said bearing foils are three in number.

12. A bearing according to claim 10 wherein:
said bearing foils comprise conically tapered spring strips.

13. A bearing according to claim 10 wherein:
said bearing foils comprise conically tapered spring strips which engage said bushing at their ends and are centrally spaced from the bushing to resiliently support the bearing cone.

14. A film lubricated cone bearing comprising:
a bushing having a conical, bearing cone receiving bore;
a plurality of thin, flexible, resiliently compliant conically tapered spring strip bearing foils within said bore and each extending generally circumferentially about a portion only of said bore;
bearing cone means rotatably supported within said bore by said bearing foils;
said bearing foils being uniformly spaced about said bore, adjacent ends of the foils being uniformly spaced apart and the foils being terminally engaged with and centrally radially spaced from said bushing for resiliently coaxially positioning the bearing cone means in said bore;
said bearing foils having inwardly presented conical bearing surfaces adapted to be supplied with a lubricating fluid and to support the bearing cone means for relative rotation to a speed at least sufficient to generate a hydrodynamic lubricating film between the cone means and each bearing surface, whereby said bearing foils are radially positioned relative to the cone means by hydrodynamic film pressure and resiliently accommodate and dampen orbital motion of the cone means; and
the wall of said bore being effective to positively limit orbital excursions of the bearing cone means.

15. A bearing according to claim 14 wherein:
both ends of each bearing foil slidably bear against the wall of said bore.

16. A bearing according to claim 14 wherein:
one end of each bearing foil is rigidly fixed to said bushing and the other end of each bearing foil slidably bears against the wall of said bore.

17. A film lubricated double cone bearing comprising:
a bushing having a conical, bearing cone receiving bore which is conically tapered outwardly from each end toward the center;
a plurality of thin, flexible, resiliently compliant, conically tapered spring strip bearing foils within each conical end of said bore and each extending generally circumferentially about a portion only of said bore;
a bearing cone rotatably supported within said bore by said foils;
said bearing foils being uniformly spaced about said bore and the foils being terminally engaged with and centrally radially spaced from said bushing for resiliently coaxially positioning the bearing cone in said bore;
said bearing foils having inwardly presented conically tapered bearing surfaces adapted to be supplied with a lubricating fluid and to support the bearing cone for relative rotation to a speed at least sufficient to generate a hydrodynamic lubricating film between the cone and each bearing surface, whereby said bearing foils are radially positioned relative to the cone by hydrodynamic film pressure and resiliently accommodate and dampen orbital motion of the cone; and the wall of said bore being effective to positively limit orbital excursions of the cone.

18. A film lubricated cone bearing rotatably supporting a bearing cone comprising:
a bushing having a conical, bearing cone receiving bore;
a plurality of thin, flexible, resiliently compliant conically tapered spring strip bearing foils within said bore and each extending generally circumferentially about a portion only of said bore;
corresponding ends of said bearing foils extending to the exterior of said bushing through slots uniformly spaced about the bushing;
means rigidly securing the external end of each bearing foil to said bushing;
the opposite end of each bearing foil slidably engaging the wall of said bore;
said bearing cone being rotatably supported within said bore by said foils;
said bearing foils having inwardly presented conically tapered bearing surfaces adapted to be supplied with a lubricating fluid and to suport the bearing cone for relative rotation to a speed at least sufficient to generate a hydrodynamic lubricating film between the cone and each bearing surface, whereby said bearing foils are radially positioned relative to the cone by hydrodynamic film pressure and resiliently accommodate and dampen orbital motion of the cone; and
the wall of said bore being effective to positively limit orbital excursions of the cone.

19. In combination:
a bearing unit having a conical, bearing cone receiving opening;
said bearing unit including bearing means providing separate conically tapered bearing surfaces presented away from and uniformly spaced about the wall of the opening;
a bearing cone rotatably supported within said opening by said bearing means;
each bearing surface extending generally circumferentially about a portion only of said cone;
said bearing surfaces being adapted to be supplied with a lubricating fluid and to support said bearing cone for relative rotation to a speed at least sufficient to generate hydrodynamic lubricating films between the cone and each bearing surface; and
said bearing means including at least one relatively thin, flexible, resiliently compliant conically tapered bearing element which furnishes one of said bearing surfaces, whereby said bearing means is adapted to be radially positioned relative to the cone by hydrodynamic film pressure and to resiliently accommodate and dampen orbital motion of the cone.

20. In combination:
a bushing having a conical, bearing cone receiving bore;
bearing means within said bore including a plurality of relatively thin, flexible, resiliently compliant conically tapered spring strips spaced around said bore and each extending generally circumferentially about a portion only of the bore;
a bearing cone rotatably supported within said bore by said spring strips;
said spring strips being supported by said bushing at positions spaced along each strip and being spaced from said bushing intermediate said positions for resiliently coaxially positioning the bearing cone in said bore;
said spring strips having inwardly presented conically tapered bearing surfaces adapted to be supplied with a lubricating fluid and to support the bearing cone for relative rotation to a speed at least sufficient to generate a hydrodynamic lubricating film between the cone and each bearing surface, whereby said spring strips are radially positioned relative to the cone by hydrodynamic film pressure and resiliently accommodate and dampen orbital motion of the cone; and the wall of said bore being effective to limit orbital excursions of said cone.

References Cited

UNITED STATES PATENTS

| | | | |
|---|---|---|---|
| Re. 25,028 | 8/1961 | Thompson | 308—73 |
| 538,055 | 4/1895 | Vose | 308—70 |
| 1,352,204 | 9/1920 | Leitch | 308—26 |
| 1,384,173 | 7/1921 | Wikander | 308—26 X |
| 2,322,004 | 6/1943 | Fast | 308—72 |
| 2,703,735 | 3/1955 | Falk et al. | 308—26 |
| 3,121,596 | 2/1964 | Price | 308—71 |
| 3,215,480 | 11/1965 | Marley | 308 |

FOREIGN PATENTS

| | | |
|---|---|---|
| 22,815 | 10/1913 | Great Britain. |
| 296,132 | 8/1928 | Great Britain. |
| 883,820 | 12/1961 | Great Britain. |
| 893,045 | 4/1962 | Great Britain. |

MARTIN P. SCHWADRON, *Primary Examiner.*

FRANK SUSKO, *Assistant Examiner.*

U.S. Cl. X.R.

308—73, 121, 26